United States Patent
Boulanger et al.

(10) Patent No.: US 11,104,426 B2
(45) Date of Patent: Aug. 31, 2021

(54) INFLATABLE DEVICE FOR EMERGENCY AIRCRAFT BUOYANCY

(71) Applicant: Safran Aerosystems, Plaisir (FR)

(72) Inventors: Romain Boulanger, Champniers (FR); Jean-Yves Rivault, Hiersac (FR)

(73) Assignee: SAFRAN AEROSYSTEMS, Plaisir (FR)

( * ) Notice: Subject to any disclaimer, the term of this patent is extended or adjusted under 35 U.S.C. 154(b) by 0 days.

(21) Appl. No.: 16/649,185

(22) PCT Filed: Sep. 24, 2018

(86) PCT No.: PCT/EP2018/075727
§ 371 (c)(1),
(2) Date: Mar. 20, 2020

(87) PCT Pub. No.: WO2019/057952
PCT Pub. Date: Mar. 28, 2019

(65) Prior Publication Data
US 2020/0216171 A1 Jul. 9, 2020

Related U.S. Application Data

(60) Provisional application No. 62/562,854, filed on Sep. 25, 2017, provisional application No. 62/562,872, (Continued)

(51) Int. Cl.
*B64C 25/56* (2006.01)
(52) U.S. Cl.
CPC .................... *B64C 25/56* (2013.01)

(58) Field of Classification Search
CPC ..................................................... B64C 25/56
See application file for complete search history.

(56) References Cited

U.S. PATENT DOCUMENTS

| 3,507,466 A | * | 4/1970 | Fleur | ........................ B64C 25/56 244/105 |
| 4,165,059 A | | 8/1979 | Summer | |

(Continued)

FOREIGN PATENT DOCUMENTS

| EP | 0091660 A1 | 10/1983 |
| GB | 1551523 | 8/1979 |

(Continued)

OTHER PUBLICATIONS

International Patent Application No. PCT/EP2018/075727, International Search Report, dated Dec. 11, 2018.
(Continued)

*Primary Examiner* — Richard G Davis
(74) *Attorney, Agent, or Firm* — Kilpatrick Townsend & Stockton LLP

(57) ABSTRACT

An inflatable device for aircraft buoyancy, configured to be inflated in case of emergency landing on water, the device comprising a first inflatable chamber configured to be inflated from a source of gas, to change from a folded state to an inflated stated, a plurality of second inflatable chambers, each configured to be supplied from gas flowing in the first chamber, via at least one supply passage, each second inflatable chamber configured to be inflated to change from a folded state to an inflated stated, wherein each supply passage comprises a check valve.

20 Claims, 6 Drawing Sheets

Related U.S. Application Data filed on Sep. 25, 2017, provisional application No. 62/562,839, filed on Sep. 25, 2017.

(56) References Cited

U.S. PATENT DOCUMENTS

| | | | |
|---|---|---|---|
| 4,312,484 A * | 1/1982 | Meisner | B64C 25/56 |
| | | | 137/852 |
| 4,655,415 A | 4/1987 | Miller et al. | |
| 5,494,469 A | 2/1996 | Heath et al. | |
| 7,056,179 B2 | 6/2006 | Courtney | |
| 2003/0057322 A1* | 3/2003 | Parrott | B64D 25/18 |
| | | | 244/106 |
| 2003/0060101 A1* | 3/2003 | Parrott | B64C 25/56 |
| | | | 441/40 |
| 2015/0102164 A1 | 4/2015 | Delorme et al. | |
| 2018/0156246 A1* | 6/2018 | Bauer | F15B 15/1457 |

FOREIGN PATENT DOCUMENTS

| | | |
|---|---|---|
| GB | 2343152 A | 5/2000 |
| WO | 2016186914 A1 | 11/2016 |

OTHER PUBLICATIONS

International Patent Application No. PCT/EP2018/075727, Written Opinion, dated Dec. 11, 2018.

\* cited by examiner

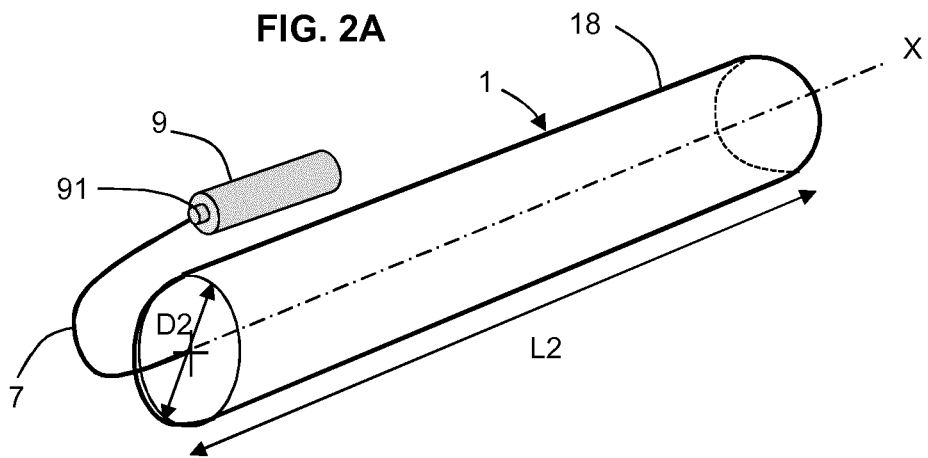
FIG. 2A
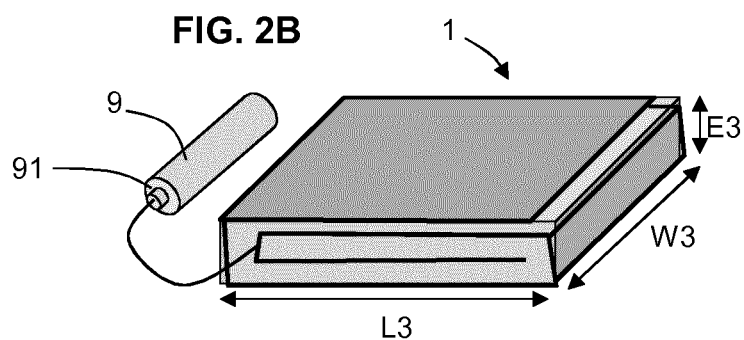
FIG. 2B
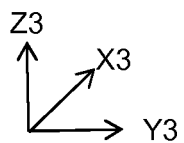

INFLATABLE DEVICE FOR EMERGENCY AIRCRAFT BUOYANCY

CROSS-REFERENCE TO RELATED APPLICATIONS

This application is a national phase entry under 35 USC § 371 of International Application PCT/EP2018/075727 ("the '727 application"), filed Sep. 24, 2018, which application claims priority to and benefits of U.S. Provisional Patent Application No. 62/562,854 ("the '854 application"), filed on Sep. 25, 2017; U.S. Provisional Patent Application No. 62/562,872 ("the '872 application"), filed on Sep. 25, 2017; and U.S. Provisional Patent Application No. 62/562,839 ("the '839 application"), filed on Sep. 25, 2017. The '727, '854, '872, and 839 applications are hereby incorporated in their entireties by this reference.

FIELD OF THE INVENTION

The present disclosure relates to inflatable devices for emergency aircraft buoyancy. In particular, it is desired to provide a buoyancy system on helicopters, such that in case of water landing, notably under emergency condition, the helicopter remains afloat and sinking and/or capsizing is thereby prevented.

BACKGROUND OF THE DISCLOSURE

There is a need to provide helicopters with a buoyancy system. Such buoyancy system is generally an inflatable system that is activated only when needed, and the rest of the time, i.e. under normal operational conditions, the inflatable system is not inflated and shall occupy a space as small as possible. Also the weight of the system shall be as small as possible.

Such inflatable systems are known from documents U.S. Pat. Nos. 4,655,415 or 4,165,059. In addition to aircraft buoyancy aids, there may be provided a raft for evacuating people.

Usually, in the aircraft buoyancy aids, there are provided several compartments, each of them being supplied independently form a gas source via dedicated piping whereby some redundancy is achieved.

Under the above exposed perspective, there is a need to propose new solutions to improve the overall compromise regarding weight and occupied volume in deflated state versus performance after deployment and/or inflation.

SUMMARY OF THE DISCLOSURE

According to a first general aspect of the present disclosure, there is disclosed an inflatable device for aircraft buoyancy, configured to be inflated in case of emergency landing on water, the device comprising:

a first inflatable chamber configured to be inflated from a source of gas, to change from a folded state to an inflated stated, a plurality of second inflatable chambers, each configured to be supplied from gas flowing in the first chamber, via at least one supply passage, each second inflatable chamber configured to be inflated to change from a folded state to an inflated stated, wherein at least one supply passage comprises a check valve.

Thanks to these dispositions, only one piping is required to supply the whole device through the first inflatable chamber, and we avoid the use of other piping(s) for supplying the second chambers.

It should be noted that the so-called 'second chambers' constitute here the main buoyancy units (otherwise called buoyancy bladders or bags) of the device.

The term 'first chamber' designates here an inflatable bladder, which is advantageously the sole one coupled to the source of gas. The 'first chamber' may also participate to the overall buoyancy, but in most proposed embodiments, to a much lesser extent than the second chambers.

Both first and second chambers are made from a flexible airtight fabric. This fabric is thin and light, i.e. less than 400 g per $m^2$. This fabric is less than 2 mm thick, preferably less than 1 mm thick. This can be a woven or non-woven nylon/polyurethane compound.

The term 'folded state' means a compacted, minimal volume state, achievable when no gas remains in the chambers.

Since only one supply piping is used, the device can be packed in a very efficient fashion and there is more flexibility to propose different small deflated packed configurations, e.g. cylindrical or parallelepiped, or any desired packed volume.

It should be understood by 'gas' either simply air or more preferably a specific gas or gas combination, based on helium or nitrogen. Helium can be considered as an optimized choice due to its low weight. The source of gas is designed to supply a predetermined quantity of gas to inflate the first and second chambers up to a target pressure at normal environmental condition (1 bar, 20° C.), such target absolute pressure is comprised between 1.05 bar and 1.5 bar, preferably between 1.15 bar and 1.2 bar. Under another perspective, the inflation pressure is stated as a relative pressure that can be comprised in the range [0.05 bar-0.5 bar].

It should be noted that each respective check valve allows a passage of gas from the first chamber to a respective second chamber, and prevent a passage of gas from a second chamber to the first chamber. Hence, after inflation, if one second chamber is punctured, the other second chambers remain unaffected, being protected by their respective check valves.

Regarding the clause "wherein at least one supply passage comprises a check valve", it should be understood that if there are provided N second chambers, the number of check valve is at least (N−1). In the case one particular second chamber is deprived of check valve, this second chamber is fluidly united with the first chamber, such first chamber may have a check valve at its inlet port.

Each supply passage, fitted with a check valve or not, is arranged directly in a wall separating the first chamber from the adjacent second chamber.

In a preferred configuration, there provided as many check valves (i.e. N) as the number N of second chambers.

According to one option, each supply passage can comprise a calibrated orifice. Thereby, respective inflations of the second chambers can be caused to follow a predefined flow rate, and the inflation sequence of the overall device can be made more predictable and reliable. For example one second chamber can be inflated faster than another one to promote a preferred deployment. Deployment preferred sequence may depend on the packed configuration when the device is at rest before inflation.

According to one option, the first chamber is coupled to a source of gas under pressure via a selectively controlled valve. The source of gas can be a pressurized reservoir (also called canister) with a predetermined quantity of gas such as nitrogen, helium or the like. The selectively controlled valve is caused to change to its open state upon signal from the pilot of the aircraft or from an automatic emergency onboard controller, so to cause inflation of the chambers.

According to an alternative option, the source of gas can be a chemical gas generator triggered by an igniter. This represents an alternative lightweight solution for providing gas is a predetermined quantity.

According to one advantageous aspect, there is provided a main envelope which forms an outer wall of the second chambers at inflated state, and the first chamber is housed within the main envelope. Whereby, the first chamber is protected inside the main envelope against environmental hazards; also the inlet ports of the second chambers (and their check valves) are protected inside the main envelope against environmental hazards; there are no inlet ports projecting outwardly at the second chambers.

According to one option, each second chamber may be adjacent to two other neighboring second chambers. This turns out to be a balanced configuration, with functional symmetry. In case one second chamber is punctured and deflates, the two neighboring other second chambers can protrude inside the volume left free by the deflated chamber. Advantageously, this is true for any punctured second chamber.

According to one option, each second chamber is separated from two neighboring second chambers by partition walls, each second chamber being delimited radially outwards by the main envelope, sidewise by two partition walls, and radially inwards by the first chamber. This is a simple cylindrical configuration.

According to one option, each partition wall exhibits a first border disposed radially inwards, wherein said first border is glued to the wall of the first chamber, and a second border disposed radially outwards, said second border being glued to the main envelope inner side. Besides, the two longitudinal ends of the partition wall are also glued to the main envelope inner side.

According to one option, the first chamber is elongated and extends substantially in a longitudinal direction (X).

According to one option, the partition walls extend generally along the longitudinal direction (X).

According to one possible choice, the first chamber is tubular when inflated.

After inflation, the first chamber exhibits a first volume at inflated state, said first volume being generally less than 5% of the overall volume of all second chambers at inflated state. The inventors have achieved a typical ratio of 3% or less, and preferably 1% for the first volume versus the overall volume of all second chambers.

According to one option, there is provided a main inlet port at the first chamber and said inlet port is located in axial position, namely at one axial end of the device.

According to an alternative option, the main inlet port at the first chamber can be arranged radially with respect to an elongation axis of the first chamber.

According to one option, the check valves are each at different axial positions along the longitudinal direction. This provides flexibility for packing and this enables to downsize the occupied volume in most cases.

According to one option, there are provided attachment means to attach the chambers assembly to at least to a portion of the aircraft frame or to a portion of the landing skid/wheel landing gear. Such attachment means can be one or more girt(s), harness, retaining net or the like, that can be compatible with any type of landing gear.

According to one option, the attachment means comprise at least a girt having an end pad glued to the main envelope outer side. Advantageously, the end pad can be glued to an area astride two second chambers.

According to an alternative option, the attachment means may comprise a net that surrounds at least partially the chambers assembly.

According to one option, the second chambers are arranged one after another along the longitudinal direction X, with partition walls disposed transversally, and the first chamber is located at a radially out ward position. This forms a conventional 'in-line' configuration.

According to one option, the number (N) of buoyancy chambers (second chambers) is comprised between 3 and 6. The number of buoyancy chambers can be adapted to the helicopter manufacturer needs and/or the missions assigned to the helicopter. Dependency requirements and resistance to one or more failure can dictate the need to increase the number of compartments/buoyancy chambers.

According to one option, the device may further comprise a pop out protective cover in a packed configuration. Thereby, the inflatable device is protected before use. The cover is released under the inflation pressure or via the blowing of a pyrotechnic fuse.

According to one option, the device may further comprise purge passages at each second chamber to deflate the second chambers after test, and then the purge passages remaining closed in a normal use configuration. For deflating after pressure testing, gas is drawn by a vacuum source. This allows testing process to be carried out prior to packing and delivery in the packed state According to one option, there may be defined a packing density index PDI defined by the gas volume obtained at the inflated state under normal conditions, i.e. 1 atm of external pressure and a temperature of 20° C., divided by the occupied volume in the packed state, characterized in that PDI is at least 25, typically around 40, and preferably around 50.

According to a second aspect of the present, which is considered to be possibly independent from the first aspect exposed above, there is proposed an inflatable device for aircraft buoyancy, configured to be inflated in case of emergency landing on water, the device comprising:

a plurality of buoyancy inflatable chambers (21-25), each buoyancy inflatable chamber being configured to be inflated to change from a folded state to an inflated stated, wherein there is provided a main envelope, with substantially a cylindrical shape with a longitudinal axis (X) at inflated state, wherein each buoyancy inflatable chamber is adjacent to two neighboring other second chambers, wherein each buoyancy inflatable chamber (21-25) is separated from two neighboring buoyancy inflatable chambers by partition walls which arranged parallel to the longitudinal axis (X).

Each compartment/buoyancy chamber extends from one axial end to the device to the other axial end to the device.

The inventors have found that this longitudinal arrangement provides a better behavior against pitch and roll according to sea state in case on compartment is punctured.

According to one option, the number (N) of buoyancy inflatable chambers is comprised between 3 and 4.

Gas supply can be provided from a central tubular chamber as proposed above. Alternately, gas supply can be provided individually from external inlet ports.

Regarding the second aspect of the disclosure, it can be combined with any optional feature presented for the first aspect of the disclosure.

For example there may be provided a main envelope which forms an outer wall of the second chambers at inflated state.

BRIEF DESCRIPTION OF THE DRAWINGS

Other features and advantages of the invention appear from the following detailed description of one of its embodiments, given by way of non-limiting example, and with reference to the accompanying drawings, in which:

FIG. 2A illustrates a diagrammatic perspective view of a buoyancy equipment according to a first embodiment, in a deflated packed state, FIG. 2B illustrates a diagrammatic perspective view of a buoyancy equipment according to a variant embodiment, in a deflated packed state.

DETAILED DESCRIPTION OF THE DISCLOSURE

In the figures, the same references denote identical or similar elements. For the sake of clarity, some elements may not be represented at scale.

System Overview

Figure 1:
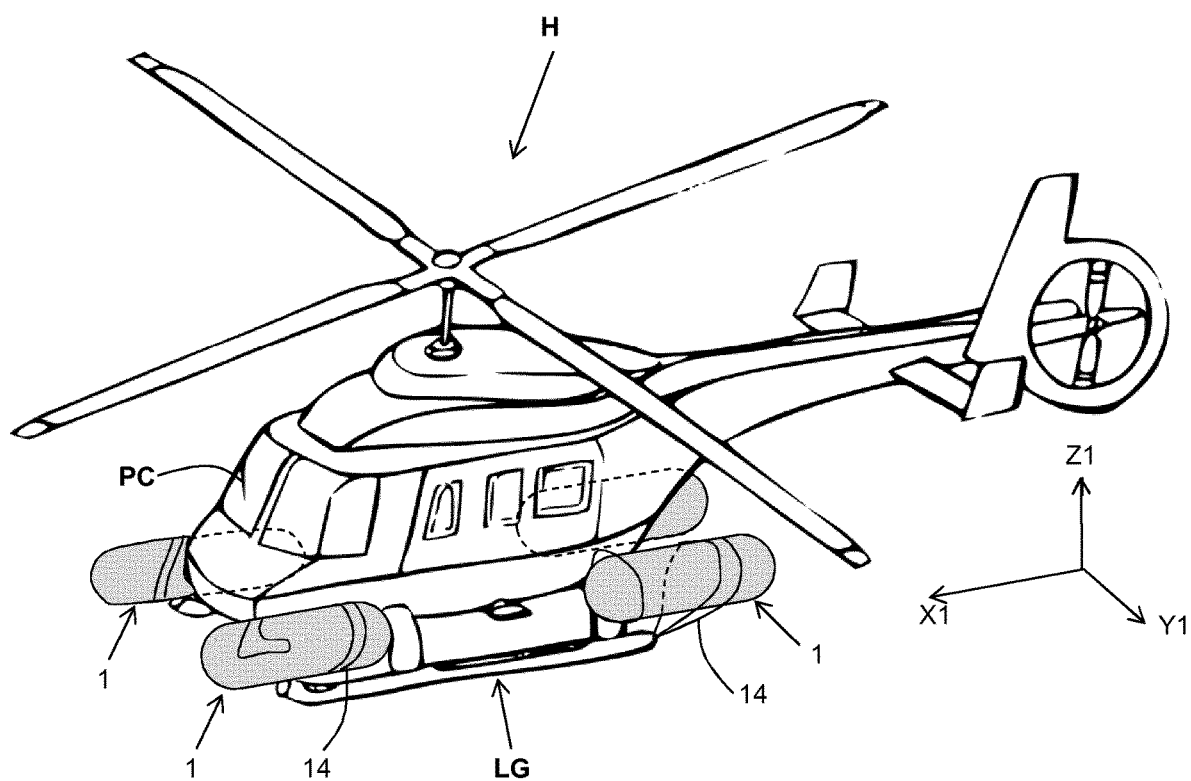
FIG. 1 is a diagrammatic perspective view of a rotary wing aircraft equipped with a buoyancy equipment according to the present disclosure, in an inflated state.

In the context of the present disclosure, as illustrated at FIG. 1, a rotary wing aircraft such as a helicopter H is provided with a buoyancy aid system 1. The term 'floatation aid' is also used. It prevents sinking of the aircraft. The buoyancy aid system is attached to at least a portion of the aircraft frame or to a portion of the landing gear LG. The landing gear LG can be a skid-type landing gear or wheeled landing gear according to the type of helicopter, other types of landing gear are nonetheless not excluded.

The pilot is sitting in the passenger compartment PC otherwise called cockpit. The buoyancy aid system can also be lodged in an outer compartment next to the passenger compartment PC, or generally in an outer compartment attached to the structure of the aircraft.

In the shown example, there are four inflatable devices, each denoted by reference 1, one at left front corner, one at right front corner, one at left aft corner and one at right aft corner. When the aircraft floats at sea, there are more or less pitch and roll movements, according to the state of the sea, and the overall stability of the aircraft depends on Archimedes buoyancy thrust exerted at each inflatable device 1.

Figure 3:
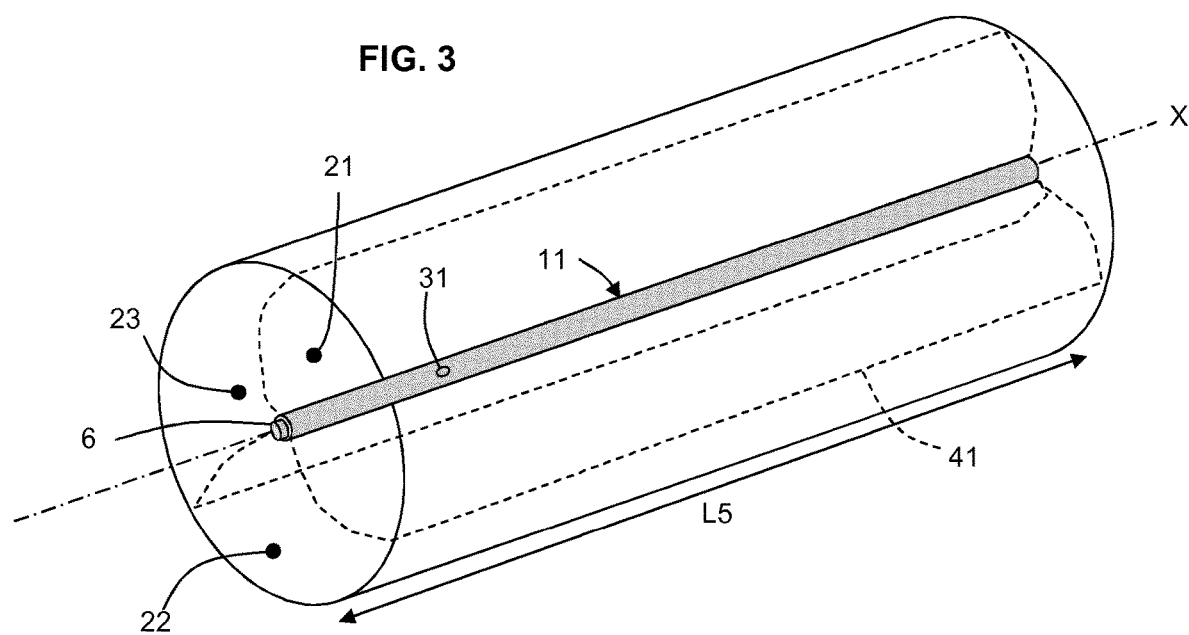
FIG. 3 is a diagrammatic perspective view of a buoyancy equipment according to a first embodiment, in a inflated state.

In the stand-by mode as well as when inflated, as depicted at FIGS. 1 & 3, each inflatable device 1 is attached to the aircraft structure via attachment means 14, which are to be described in further details later.

The aircraft H is depicted with the following space reference: X1 denotes the longitudinal axis of the aircraft, Y1 denotes the transverse axis of the aircraft, Z1 denotes the vertical axis of the aircraft.

In normal conditions, each inflatable device 1 is arranged in a minimal volume configuration, in a stand-by mode, ready to be activated and inflated. The minimal volume configuration is otherwise called "packed configuration".

In the example depicted and described, no evacuation raft is included. However in other embodiments, a raft can be added to the buoyancy aid system.

FIG. 2A depicts packed configuration having a substantially cylindrical shape. The package extends along a longitudinal axis X, over a distance L2 substantially corresponding to the length in the inflated state. Diameter of the packed configuration, denoted D2, is typically comprised between 10 cm and 50 cm.

It should be appreciated that the longitudinal axis X of the inflatable device 1 is not necessarily parallel to the longitudinal axis X1 of the aircraft. However, X may be parallel to Y1, Z1 or to any other direction.

Inflation of the inflatable device 1 is obtained by introduction of gas coming from a gas source 9. In the shown embodiment, the gas source is a canister or reservoir 9 arranged either at immediate proximity of the chambers to be inflated, or remotely in the aircraft passenger compartment PC.

A supply hose 7 has one end connected to the reservoir 9 and the other end connected to an inlet port 6 of the inflatable device 1. The supply hose 7 is flexible, it can be made of elastomer.

The source of gas 9 is coupled to the inflatable device inlet port 6 via a selectively controlled valve 91. In one preferred embodiment, the controlled valve 91 is located at the head of the reservoir 9, but other locations are not excluded.

Figure 8:
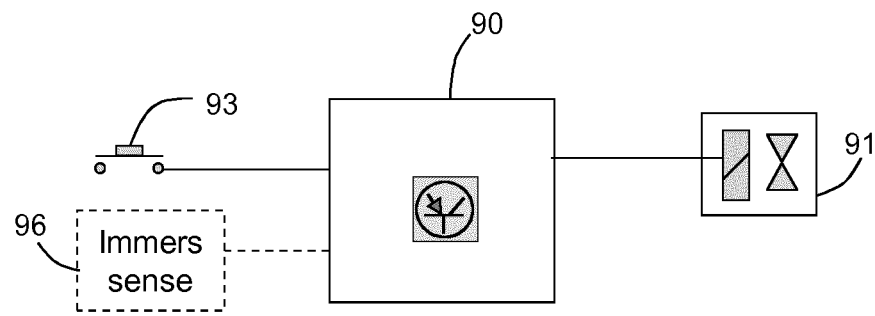
FIG. 8 illustrates a control electrical bloc diagram.

In the shown example, the reservoir (i.e. source of gas) 9 is a pressurized reservoir (also called canister) with a predetermined quantity of gas such as nitrogen or helium. The controlled valve 91 is caused to change to its open state upon signal (ref 93 FIG. 8) from the pilot of the aircraft or from an automatic emergency onboard controller (ref 90 FIG. 8) relying on immersion sensor 96, so to cause inflation of the inflatable chambers provided in the device that are described below.

It should be appreciated that alternatively, the source of gas can be a chemical gas generator triggered by an igniter, as known per se.

FIG. 2B depicts a simplified example of a packed configuration having a substantially parallelepiped shape. L3, W3, E3 denote dimensions along axis X3, Y3, Z3.

Dimensions L3 can be comprised between 20 cm and 120 cm.

Dimensions W3 can be comprised between 20 cm and 120 cm.

Dimensions E3 (thickness) can be comprised between 10 cm and 50 cm.

Practically, the packed volume is given by the aircraft manufacturer and the packed configuration together with occupied volume of the inflatable device(s) must comply and fit with the available volume.

Folding pattern can be designed on purpose according to the available space for the packed configuration. Folding pattern can be designed according to the required deployment sequence/unfolding.

Arrangement of Inflatable Chambers

Figure 4:
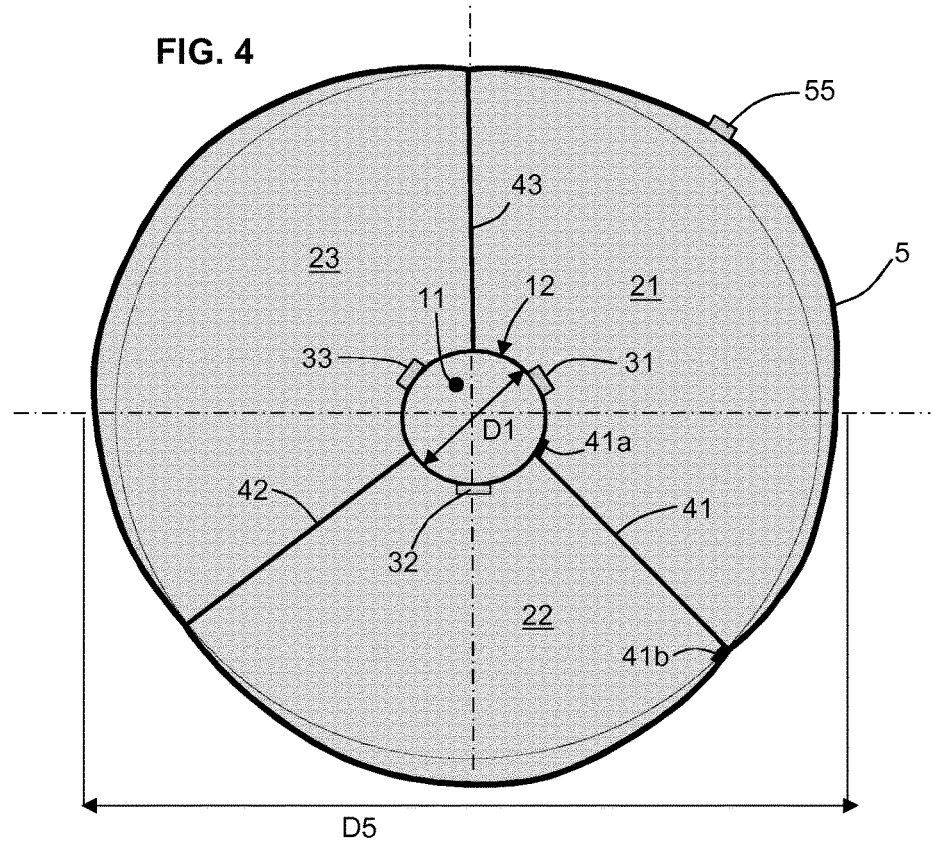
FIG. 4 is a sectional view of the buoyancy equipment shown at FIG. 3, comprising three buoyancy chambers.

In one embodiment shown at FIGS. 3 and 4, the device comprises a first inflatable chamber 11 centrally arranged. The device is configured to be inflated from the source of gas 9.

Further, the device comprises three second inflatable chambers ('second chambers' in short) denoted respectively 21,22,23. We define a "chambers assembly" which includes all the inflatable chambers, first chamber 11 and second chambers 21,22,23.

There is provided a main envelope 5 forming an outer wall of the second chambers. This is shown particularly at inflated state, but this is also true at the packed state whereas not visible on the figures.

It should be noted that instead of three, the number N of second inflatable chambers can be any from 2 to 8, therefore it's relevant to use a clause of a "plurality of second inflatable chambers". Practically it is preferred to have N comprised between 3 and 6, notably according to the aircraft mission requirements.

Each second inflatable chamber is configured to change from a folded state to an inflated stated upon supply of air.

Each second inflatable chamber 21,22,23 is configured to be supplied from gas flowing from the first chamber 11, via one supply passage denoted respectively 31,32,33.

In the shown example each supply passage 31-33 comprises a check valve 8. Each supply passage 31-33 may also comprise a calibrated orifice 81 that can be preferably part of the check valve, however having the calibrated orifice downstream or upstream the check valve is also possibly considered.

More precisely, there is provided a supply passage 31 from the first chamber to the first second chamber denoted 21 with a check valve 8. The check valve 8 allows a passage of gas from the first chamber 11 to the second chamber 21, and prevents a passage of gas from the second chamber 21 to the first chamber 11.

For the second second chamber 22, there is provided a supply passage 32 from the first chamber to the second second chamber denoted 22 with a check valve 8. The check valve 8 allows a passage of gas from the first chamber 11 to the second second chamber 22, and prevents a passage of gas from the second second chamber 22 to the first chamber 11.

Similarly for the third second chamber 23, there is provided a supply passage 33 from the first chamber to the third second chamber 23 with a check valve 8. The check valve 8 allows a passage of gas from the first chamber 11 to the third second chamber 23, and prevents a passage of gas from the third second chamber 23 to the first chamber 11.

Hence, once inflated, if one of the second chambers is punctured, the other second chambers remain unaffected, being protected by their respective check valves. Therefore, adequate redundancy is provided for floatability.

Each second chamber 21-23 is separated from two neighboring second chambers 21-23 by partition walls 41,42,43. Cross-section wise, each second chamber is delimited radially outwards by the main envelope 5, sidewise by two partition walls, and radially inwards by the first chamber. The two longitudinal ends of each partition wall are joined to the longitudinal end portions of the main envelope 5 as seen from FIG. 3.

Partition wall 41 separates chamber 21 from chamber 22, partition wall 42 separates chamber 22 from chamber 23, partition wall 43 separates chamber 23 from chamber 21.

We note R a radial direction, each partition wall extends in radial plane defined by a radial direction R and the axis X. From the cross section standpoint, we have three sectors separated by partition walls angularly spaced at about 120°. The second chambers 21-23 surrounds the centrally arranged, smaller, first chamber 11.

Figure 5:
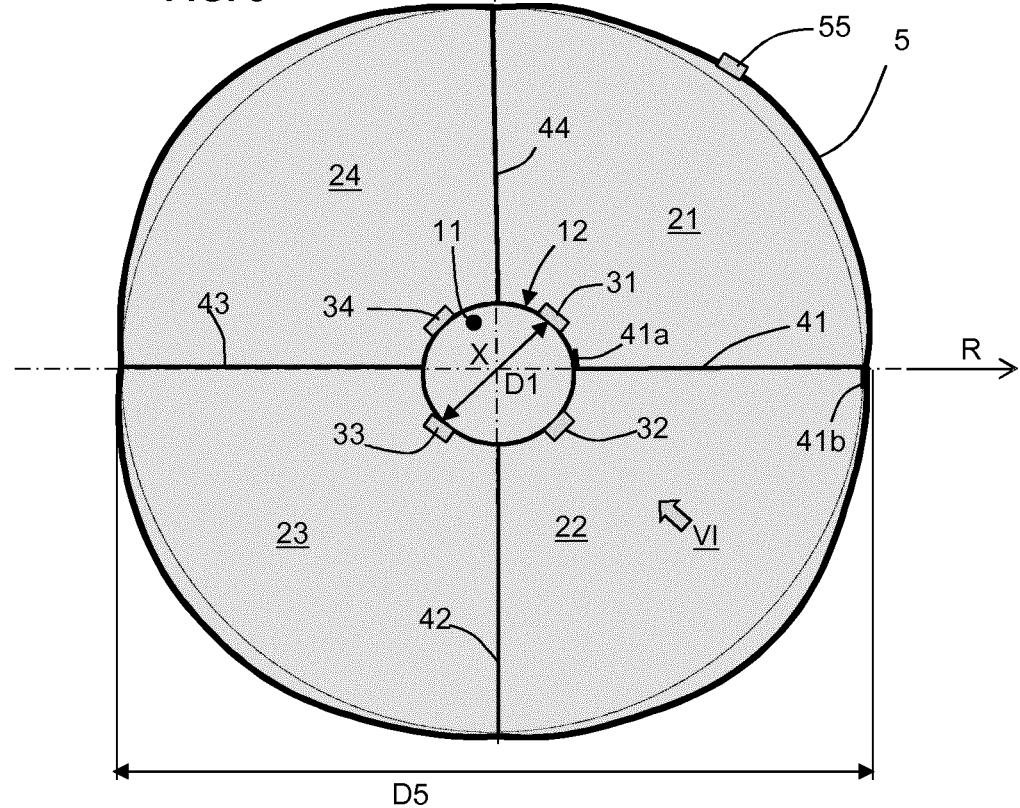
FIG. 5 is a sectional view of a buoyancy equipment according to a second embodiment, comprising four buoyancy chambers.

Each partition wall exhibits a first border 41b disposed radially inwards and glued to the wall 12 of the first chamber, and a second border 41a disposed radially outwards and glued to the main envelope inner side (illustrated only at FIG. 5 for the first second chamber 21). First and second borders 41b, 41a extend mainly along the longitudinal direction, with a width of some centimeters.

Besides, the two longitudinal ends of the partition wall are also glued to the main envelope inner side.

At inflated state, the chambers assembly is generally cylindrical, the main envelope 5 exhibits a diameter D5, the first chamber 11 extends generally in a cylindrical shape with regard to axis denoted X and with a diameter D1.

Diameter D1 of the first chamber 11 can be chosen in the range [0-100 mm].

The floatability volume VF can therefore be calculated approximately by $$VF = \tfrac{1}{4} \cdot \pi \cdot L5 \cdot (D5)^2$$

VF is defined by the floatability requirements regarding the aircraft and load. The aircraft size can be as small as a drone and as big as heavy duty helicopters, weight can range from 1 kg to several tons. Therefore the range of possible VF targets is very wide.

VF can be greater than 800 liters, greater than 1 m$^3$, greater than 1.5 m$^3$, greater than 2 m$^3$, greater than 3 m$^3$, without excluding larger volumes.

By comparison, if there is a simple folding along X (L2=L5/2), the volume Vp occupied by packed configuration in the embodiment shown at FIG. 2 is Vp=¼·π·(D2)$^2$·L2

We define a packing density index PDI defined by the total gas volume obtained at the inflated state under normal conditions (i.e. 1 atm of external pressure and a temperature of 20° C.) divided by the occupied volume in the packed configuration, namely PDI=VF/Vp D2 can be substantially smaller than D5, in one example PDI is 25.

In practice, the inventors have found that PDI is at least 25, typically around 40, and preferably around 50.

In practice, in the case of large helicopters, L2 can be comprised between 2.5 m and 5 m; and D5 can be in the range from 0.8 m up to 2 m.

It should be noted that the first chamber 11 exhibits a first volume V1 at inflated state, and the overall volume of all second chambers is denoted V2. Total floatation volume is therefore VF=V1+V2.

The first volume V1 is generally less than 5% of the overall volume V2 of all second chambers at inflated state. The inventors have achieved a typical ratio V1/V2 of 3% or less, and preferably around 1%.

Both first and second chambers are made from a flexible airtight fabric. This fabric is thin and light, i.e. less than 400 g per m$^2$. This fabric is less than 2 mm thick, preferably less than 1 mm thick. This can be a woven or non-woven nylon/polyurethane compound. The thickness of the fabric is in the range 0.3 mm to 0.5 mm.

This fabric exhibits a low inline extensibility. This fabric exhibits a good transverse flexibility, so it can be easily folded. Stated otherwise, the chamber unfolds upon inflation but the fabric does not extend itself much.

Various sheets of such fabric are assembled by gluing/assembly process.

One can use a chemical glue technique based on a polyurethane compound.

One can also use a mechanical assembly process with high frequency thermo-welding technique ("thermo-bonding" or "heat-welding" can also be used).

Variant with Four Chambers

As presented on FIG. 5, instead of three second chambers, the device may comprise four second chambers 21,22,23,24. Only the major differences are discussed below, the rest of the features are similar or identical to what was described above for the three compartment configuration.

The four second chambers have substantially the same size, occupy the same volume and therefore provide similar floatability. In a cross-section perspective, each occupies generally one quarter of a disc. The second chambers 21-24 surrounds the centrally arranged, smaller, first chamber 11.

There is provided a supply air passage denoted 31 from the first chamber 11 to the second inflatable chamber 21, a supply air passage denoted 32 from the first chamber 11 to the second chamber 22, a supply air passage denoted 33 from the first chamber 11 to the second chamber 23, a supply air passage denoted 34 from the first chamber 11 to the second inflatable chamber 24.

Partition wall 41 separates chamber 21 from chamber 22, partition wall 42 separates chamber 22 from chamber 23, partition wall 43 separates chamber 23 from chamber 24, partition wall 44 separates chamber 24 from chamber 21.

R being the radial direction, each partition wall extends in radial plane defined by a radial direction R and the axis X.

Gas Passages/Check Valve/Calibrated Orifice

Figure 6:
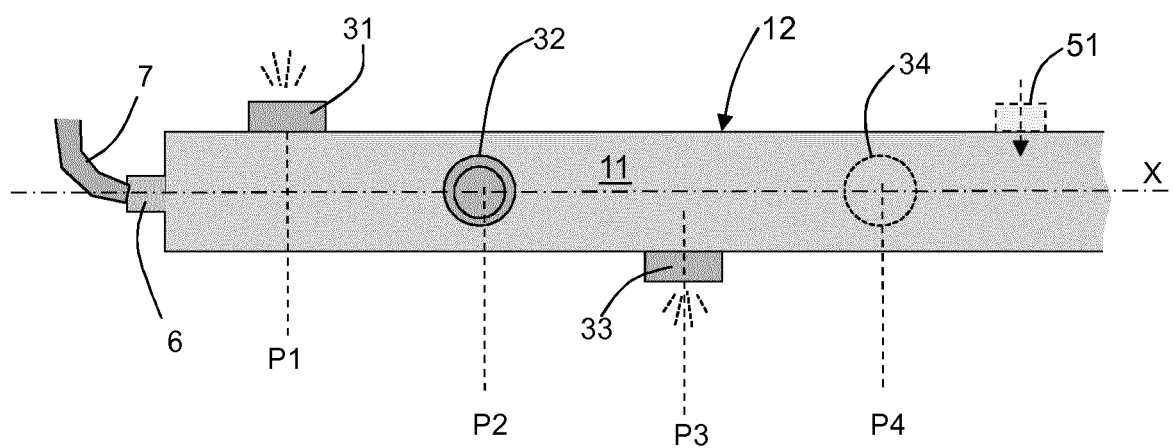
FIG. 6 illustrates some features of the distribution chamber.

As apparent from FIG. 6, the passages are each located at different axial positions P1-P4 along the longitudinal direction. More precisely, starting from the left end of the first chamber where the inlet port is arranged, we find first the first passage 31 supplying the first second chamber 21 from the first chamber 11, directed upwardly, then further along the axis X and at another angular position around the axis X the second passage 32 supplying the second second chamber 22 from the first chamber 11, directed toward the viewpoint, then still further along the axis X and still at another angular position around the axis X the third passage 33 supplying the third second chamber 23 from the first chamber 11 directed downwardly, then still further along the axis X and still at another angular position around the axis X a fourth third passage 33 supplying the fourth second chamber 24 from the first chamber 11 directed away from the viewpoint.

The passages can be spaced from one another along the axis X, with an interval distance ($P_i$-$P_{i+i}$) comprised between 5 cm and 50 cm.

Other type of positions of the passages along the axis can be considered, this provides flexibility for packing and this enables to downsize the occupied volume in most cases.

Figure 7:
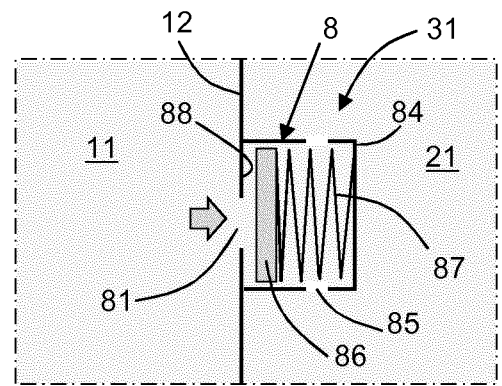
FIG. 7 shows a section view of a check valve involved in the present disclosure.

Each air passage can comprise a check valve that is described now in detail with reference to FIG. 7.

Check valve comprises a housing 84, a valve 86 and a valve seat 88. The valve seat can be arranged together with the housing or directly onto the wall 12 separating the first chamber from the second chamber.

There is provided a spring 87 to bias the valve 86 against the valve seat 88 such that the passage is closed.

The spring 87 has a low stiffness, such that the passage opens as early as delta pressure >50 mbars (pressure in first chamber is at least 50 mbars higher than pressure in second chamber). This threshold can be chosen differently for example in the range [10 mbars, 100 mbars].

Further, there are provided one or more vents 85 to let air enter the second chamber from the valve housing 84. The supply passage may comprise a calibrated orifice formed either by the orifice 81 at the valve seat or by the vents 85 at the back of the valve housing 84.

All calibrated orifices 81 from first chamber 11 to second chambers can have the same size. Alternately, some calibrated orifices can have a different size with regard to others. Each calibrated orifice can be sized specifically on purpose with regard to the desired deployment pattern. In practice, from the common supply formed by the first chamber 11, respective inflations of the second chambers can be caused to follow a predefined flow rate, and the inflation sequence of the overall device can be made more predictable and reliable. For example one second chamber can be inflated faster than another one to promote a preferred deployment fashion. Deployment preferred sequence and specific orifice sizes may depend on the packed configuration when the device is at rest before inflation.

It should be noted that the length of the first chamber can be shorter than the overall device length.

Under another perspective, the length of the first chamber can be longer than the overall device length, and at the inlet end can exhibit a curve such that the inlet can be located not right in the axis but rather at a radial position away from the axis.

Attachment Means

There are provided attachment means to attach the chambers assembly to at least to a portion of the aircraft frame or to a portion of the landing gear LG. According to one option, the attachment means comprise at least a girt 14 surrounding part or all the chambers assembly. One end of the girt is attached to the aircraft structure whereas the other end comprised a pad be glued to the main envelope. Advantageously, the pad can be glued to an area astride two second chambers.

In addition or alternatively, the attachment means may comprise a net, like a fishnet structure, that surrounds at least partially the chambers assembly. The attachment means allow the inflatable chambers to inflate, without hindrance. Thus, the attachment means are sized for the inflated geometry of the chambers assembly, although they are assembled to the chambers assembly at the deflated state.

Testing Process Prior to Delivery

Each second chamber can comprise purge passages 55 to deflate the second chambers after test, the purge passages remaining closed in a normal use configuration. Only one is represented at FIGS. 4 & 5.

It may be required to test the inflatable device 1 prior to delivery. Inflation can be carried out as normal use (i.e. via the main inlet 6), but purge should be performed afterward to return the device into the packed configuration. For that purpose, the device can be provided with purge passages for each compartment (i.e. each second chamber).

According to one possibility, there may be provided a purge valve 55 arranged at the external wall of each second chamber. In this case, it is possible to plug manually a purge device to deflate the second chamber. After that the purge valve is return to its rest closed state, and then the purge valve remains closed in a normal use configuration.

According to another possibility, there may be provided a purge valve 51 arranged between each second chamber and the first chamber as illustrated in dotted line at FIG. 6. This purge valve remains closed unless a vacuum is applied to the first chamber. This will be done only on purpose and therefore purge cannot happen during normal use configuration. This purge valve can have an opening threshold higher than the one of the air inflation check valves described above.

Other Variants

Figure 9:
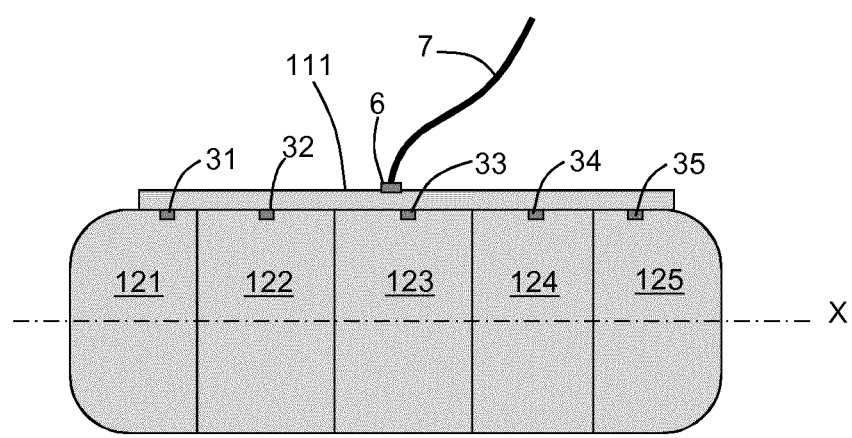
FIG. 9 illustrates a third embodiment, namely a 'in-line' partition configuration

According to another variant represented in FIG. 9, there may be provided second chambers arranged one after another along the longitudinal direction X, with transverse partition walls separating the second chambers, i.e. the partition walls extend perpendicularly with respect to the axis X. Further there is provided a first chamber 111 is located at a radially outward position. The partition walls are perpendicular to the longitudinal direction X.

The second chambers are denoted 121-125 are arranged, taken from far left to far right on the FIG. 9, one after another along the longitudinal direction X. More precisely, starting from the left end, we find first the first passage 31 supplying the first second chamber 121 from the first chamber 111, then further along the axis the second passage 32 supplying the second second chamber 122 from the first chamber 111, then still further along the axis X the third passage 33 supplying the third second chamber 123 from the first chamber 111, then still further along the axis X a fourth third passage 34 supplying the fourth second chamber 124 from the first chamber 111, then still further along the axis X a fifth passage 35 supplying the fifth second chamber 125 from the first chamber 111. Here we note that inlet port 6 is located at a longitudinal middle portion of the first chamber 111. We also note that the inlet port 6 can be located elsewhere, notably at one end of the first chamber. Also the first chamber 111 can have one longitudinal end with a curve shape, i.e. the first chamber is not necessarily straight or strictly tubular.

Figure 10:
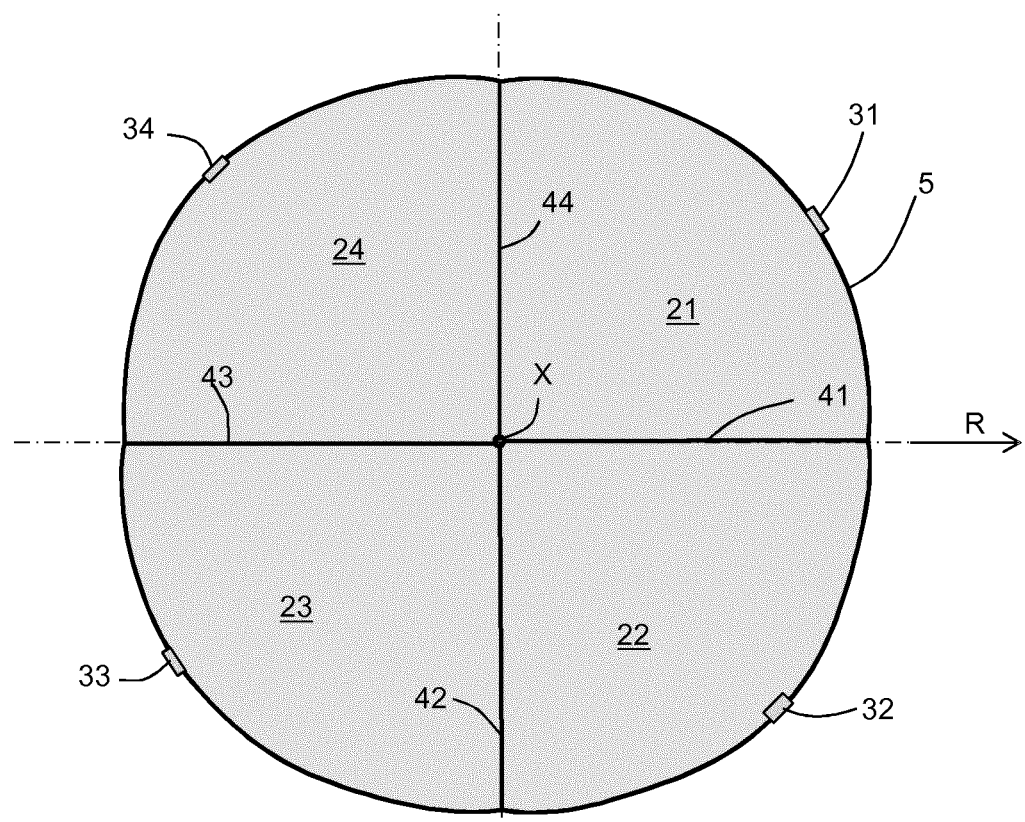
FIG. 10 illustrates another embodiment with longitudinal compartments, but without a central distribution chamber, the figure showing a transverse section of the device.

According to second aspect of the present disclosure represented in FIG. 10, there is proposed an inflatable device comprising a plurality of buoyancy inflatable chambers 21-24, arranged generally parallel to the longitudinal direction X.

Similar to what was described earlier with reference to FIG. 5, there is provided a main envelope, with substantially a cylindrical shape and a longitudinal direction X at inflated state. Each second chamber 21-24 is adjacent to two neighboring other second chambers 21-24, each second chamber 21-24 is separated from two seconds chambers 21-24 by partition walls 41-44 which arranged parallel to the longitudinal direction.

Each compartment/second chamber extends from one axial end to the device to the other axial end to the device.

It should be noted that in this second aspect, the device is deprived of any central chamber. Inlet passages 31-34 are arranged at the outer wall of each chamber 21-24. Each inlet passages 31-34 is connected to a supply hose, and may comprise a check valve preventing gas back flow once the chambers are inflated.

The invention claimed is:

1. An inflatable device for aircraft buoyancy, configured to be inflated in case of emergency landing on water, the device comprising:
a first inflatable chamber configured to be inflated from a source of gas, to change from a folded state to an inflated stated,
a plurality of second inflatable chambers, each configured to be supplied from gas flowing in the first chamber, via at least one supply passage, each supply passage being arranged directly in a wall separating the first inflatable chamber from the respective adjacent second inflatable chamber, each second inflatable chamber configured to be inflated to change from a folded state to an inflated stated, wherein each supply passage comprises a check valve.

2. The device according to claim 1, wherein each supply passage comprises a calibrated orifice.

3. The device according to claim 1, wherein the first chamber is coupled to a source of gas under pressure via a selectively controlled valve.

4. The device according claim 1, wherein there is provided a main envelope forming an outer wall of the seconds chambers at inflated state and the first chamber is housed within the main envelope.

5. The device according to claim 4, wherein each second chamber is adjacent to two neighboring other second chambers.

6. The device according to claim 5, wherein each second chamber is separated from two neighboring second chambers by partition walls, each second chamber being delimited radially outwards by the main envelope, sidewise by two partition walls, and radially inwards by the first chamber.

7. The device according to of claim 1, wherein the first chamber is elongated and extends substantially in a longitudinal direction.

8. The device according to claim 7, wherein the first chamber is tubular when inflated.

9. The device according to claim 1, wherein there is provided a main inlet port at the first chamber and said inlet port is located in axial position, namely at one axial end of the device.

10. The device according to claim 7, wherein the supply passages are each at different axial positions along the longitudinal direction.

11. The device according to claim 1, wherein a chambers assembly is defined as the assembly of first and second chambers, wherein the device further comprises attachment means to attach the chambers assembly to a portion of the aircraft frame or to a portion of the landing gear.

12. The device according to claim 11, wherein the attachment means comprise at least a girt having an end pad glued to the main envelope outer side.

13. The device according to claim 1, wherein the second chambers are arranged one after another along the longitudinal direction, with transverse partition walls, and the first chamber is located at a radially outward position.

14. The device according claim 1, wherein the number of buoyancy chambers is comprised between 3 and 6.

15. The device according to claim 1, further comprising a pop out protective cover in a packed configuration.

16. The device according to claim 1, further comprising purge passages at each second chamber to deflate the second chambers after test, the purge passages remaining closed in a normal use configuration.

17. The device according to claim 1, wherein there is defined a packing density index PDI defined by gas volume obtained at an inflated state under normal conditions divided by an occupied volume in a packed state, wherein the PDI is at least 25.

18. The device of claim 17, wherein the normal conditions comprise about 1 atm of external pressure and a temperature of about 20° C.

19. The device of claim 17, wherein the PDI is about 40.

20. The device of claim 17, wherein the PDI is about 50.

* * * * *